United States Patent
Cook et al.

[11] Patent Number: 6,099,042
[45] Date of Patent: Aug. 8, 2000

[54] FUEL TANK SUPPORT

[75] Inventors: James Michael Cook, Dearborn Heights; Robin Cambell Miller, Riverview, both of Mich.

[73] Assignee: Ford Global Technologies, Inc., Dearborn, Mich.

[21] Appl. No.: 08/985,654

[22] Filed: Dec. 5, 1997

[51] Int. Cl.[7] .................................................. B65D 90/02
[52] U.S. Cl. ............................................................ 280/834
[58] Field of Search .................................. 280/830, 831, 280/833, 834, 837

[56] References Cited

U.S. PATENT DOCUMENTS

| | | |
|---|---|---|
| 3,701,430 | 10/1972 | Pringle . |
| 3,968,896 | 7/1976 | Giacoletti et al. . |
| 4,093,254 | 6/1978 | Ezaki . |
| 4,353,318 | 10/1982 | Williams ................................. 114/211 |
| 4,371,181 | 2/1983 | Monigold et al. . |
| 4,625,980 | 12/1986 | Lyzohub . |
| 4,895,268 | 1/1990 | Hyde . |
| 4,930,811 | 6/1990 | Tsukada et al. . |
| 4,995,356 | 2/1991 | Kronich . |
| 5,195,780 | 3/1993 | Inoue et al. . |
| 5,308,573 | 5/1994 | Hirakawa . |
| 5,366,246 | 11/1994 | Chen et al. . |
| 5,380,042 | 1/1995 | Hively et al. . |
| 5,381,871 | 1/1995 | Ohta . |
| 5,405,167 | 4/1995 | Lee . |
| 5,496,069 | 3/1996 | Milligan . |
| 5,518,272 | 5/1996 | Fukagawa et al. ...................... 280/834 |
| 5,527,052 | 6/1996 | Litin ..................................... 280/47.26 |
| 5,542,707 | 8/1996 | Kamei et al. ........................... 280/834 |
| 5,547,224 | 8/1996 | Kami et al. ............................. 280/834 |
| 5,556,133 | 9/1996 | Oku et al. ............................... 280/781 |
| 5,560,651 | 10/1996 | Kami et al. . |
| 5,794,979 | 8/1998 | Kasuga et al. ......................... 280/834 |
| 5,878,902 | 3/1999 | Cowan et al. ............................ 22/1.5 |

*Primary Examiner*—Kevin Hurley
*Assistant Examiner*—Andrew J. Fischer
*Attorney, Agent, or Firm*—Jerome R. Drouillard; Roger L. May

[57] ABSTRACT

A fuel tank support for supporting and protecting a plastic fuel tank is mounted to the vehicle with the plastic fuel tank supported therein. Integral mounting members are formed in the fuel tank support to provide structural integrity, thereby obviating the need for additional mounting hardware and straps. In addition, apertures formed on the walls of the support provide vent holes for venting stagnant hot air from the space between the fuel tank and the fuel tank support.

14 Claims, 3 Drawing Sheets

FUEL TANK SUPPORT

FIELD OF THE INVENTION

This invention relates to fuel tank supports, and more particularly to a fuel tank support for plastic automotive fuel tanks.

BACKGROUND OF THE INVENTION

It is generally known to mount plastic fuel tanks at the midpoint underneath an automotive vehicle. Accordingly, the vehicle itself protects the plastic fuel tank. In addition, it is known to mount steel fuel tanks aft axle (behind the rear axle). However, when mounting plastic fuel tanks aft axle, the fuel tank must be protected from hot exhaust gases, especially if the exhaust pipe should rupture forward of the tank; protrusion from foreign objects, as may be the case during a collision or during off-road vehicle travel; and, protection from the rear chassis components, such as a shock absorber, should the same break from its mount. Various apparatuses exist which are aimed at protecting the plastic fuel tank. These apparatuses include shields mounted to the chassis of the vehicle to deflect foreign objects away from the tank or to protect the tank from the hot exhaust gases.

The inventors of the present invention have found certain disadvantages with prior art fuel tank shields. For example, the shields require additional mounting hardware to mount the shield to either the tank itself or to the vehicle's chassis. Further, these shields tend to completely surround the fuel tank and may not provide means to allow hot air surrounding the tank to either vent from the area between the tank and the shield, or alternatively, do not provide an effective means of deflecting hot air away from the plastic fuel tank.

SUMMARY OF THE INVENTION

Accordingly, it is an object of the present invention to provide a fuel tank support for supporting and protecting a plastic fuel tank. In one particular aspect of the invention, the fuel tank support includes a front wall, a rear wall, a bottom wall joining said front and rear walls, and side walls joining the front and rear walls and the bottom wall. The walls cooperate to form an enclosure having an exterior and an interior for holding the fuel tank. The fuel tank support defines a longitudinal axis extending through the front wall and the rear wall. The fuel tank support further includes a pair of mounting support structures integrally formed into the front wall, the rear wall and the bottom wall. A pair of mounting flanges are formed on a peripheral edge of the front and the rear walls, respectively, and integrally formed to the mounting support structures for mounting the fuel tank support to the vehicle.

In a preferred embodiment, the mounting support structures are formed aparallel to the longitudinal axis of the fuel tank support.

Also, in a preferred embodiment, the fuel tank support further includes a plurality of vents extending through a plurality of the walls for venting air from the interior of the fuel tank support. Each vent may comprise a hole extending through a wall, and, an interior facing concave surface formed on the exterior of said support and substantially covering the hole. The concave surface is attached to a wall at a forward facing end thereof and open at a rearward facing end thereof.

An advantage of the present invention is that a low cost, easily manufacturable fuel tank support is provided.

Another advantage of the present invention is that a fuel tank support may be easily installed onto the vehicle.

Yet another advantage of the present invention is that the number of separate component parts is reduced.

Yet another advantage of the present invention is that heat may be deflected away from the plastic fuel tank while any trapped hot air may be vented from the area between the fuel tank and the fuel tank support.

Other object, features and advantages of the present invention will be readily appreciated by the reader of the specification.

BRIEF DESCRIPTION OF THE DRAWINGS

The invention will now be described by way of example with reference to the accompanying drawings, in which.

DETAILED DESCRIPTION OF THE PREFERRED EMBODIMENTS

Figure 1:
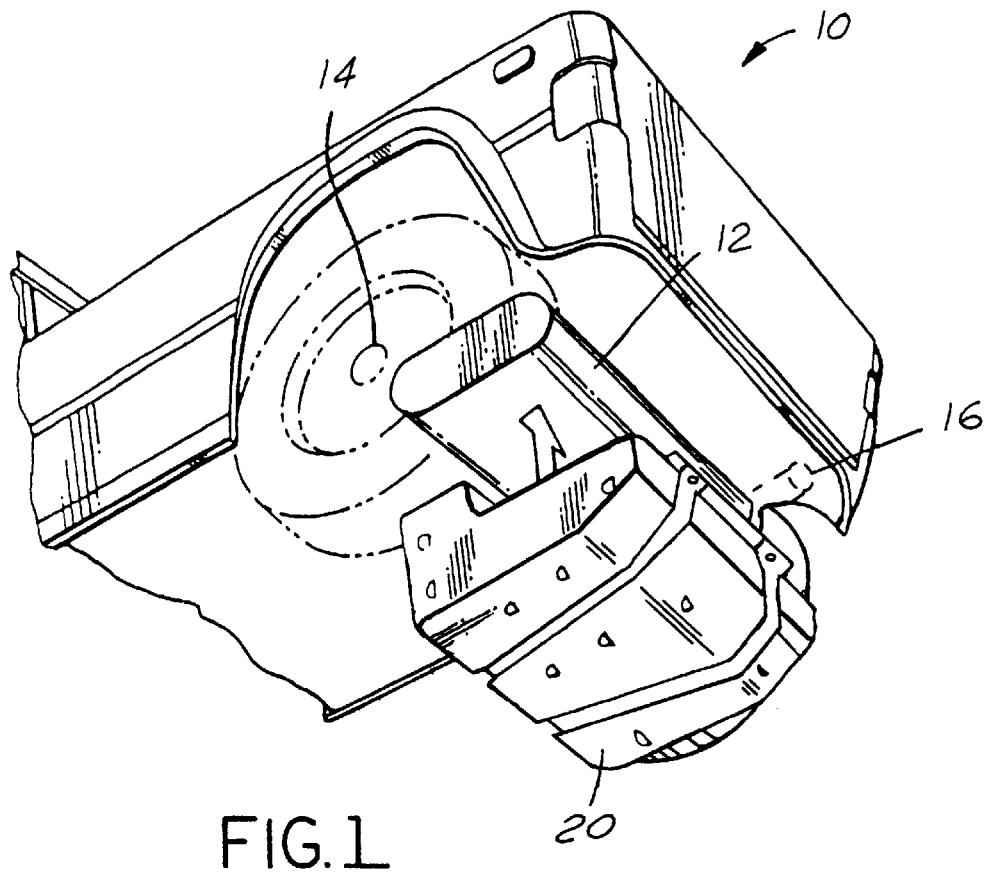
FIG. 1 is a diagrammatic representation of the fuel tank support being installed on a vehicle according to the present invention.
Figure 2:
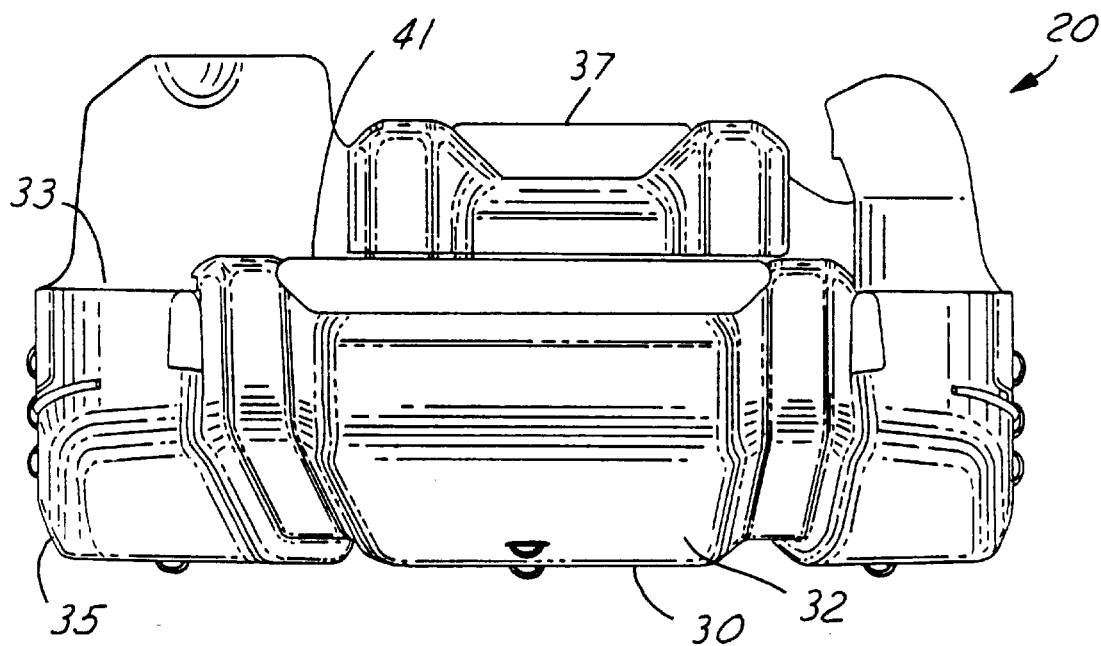
FIGS. 2–5 are various views of the fuel tank support according to the present invention.

Automotive vehicle 10, shown in FIG. 1, includes plastic fuel tank 12 mounted behind the vehicle's rear axle. Exhaust pipe 16 passes along one side of fuel tank 12. According to the present invention, fuel tank support 20, which, in addition to being a support for fuel tank 12, acts as both a skid plate and heat shield, is shown being assembled to the underside of vehicle 10. Support 20 is formed of suitable metal material to enclose and protect plastic fuel tank 12. For assembly ease, support 20 is fastened directly to vehicle 10.

Figure 3:
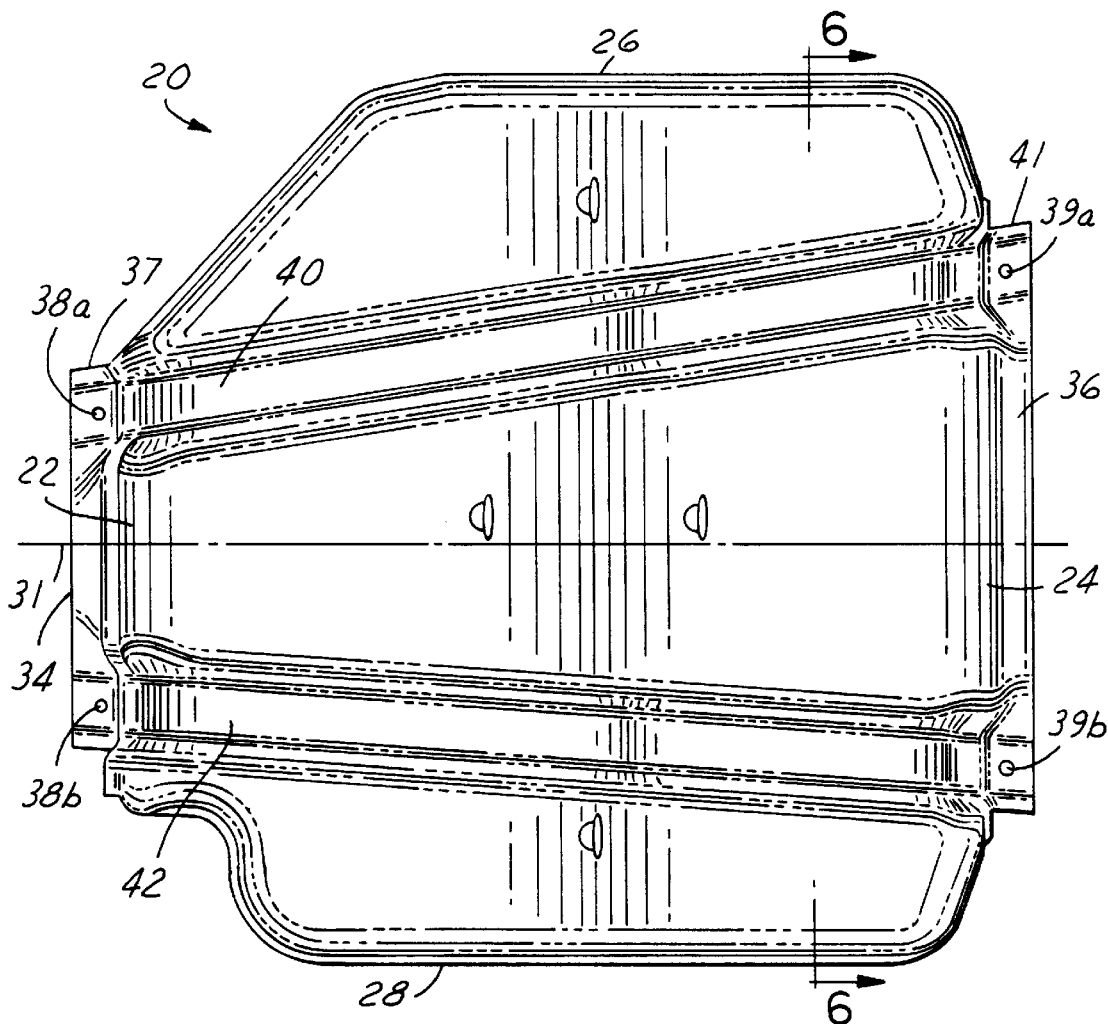
Figure 4:
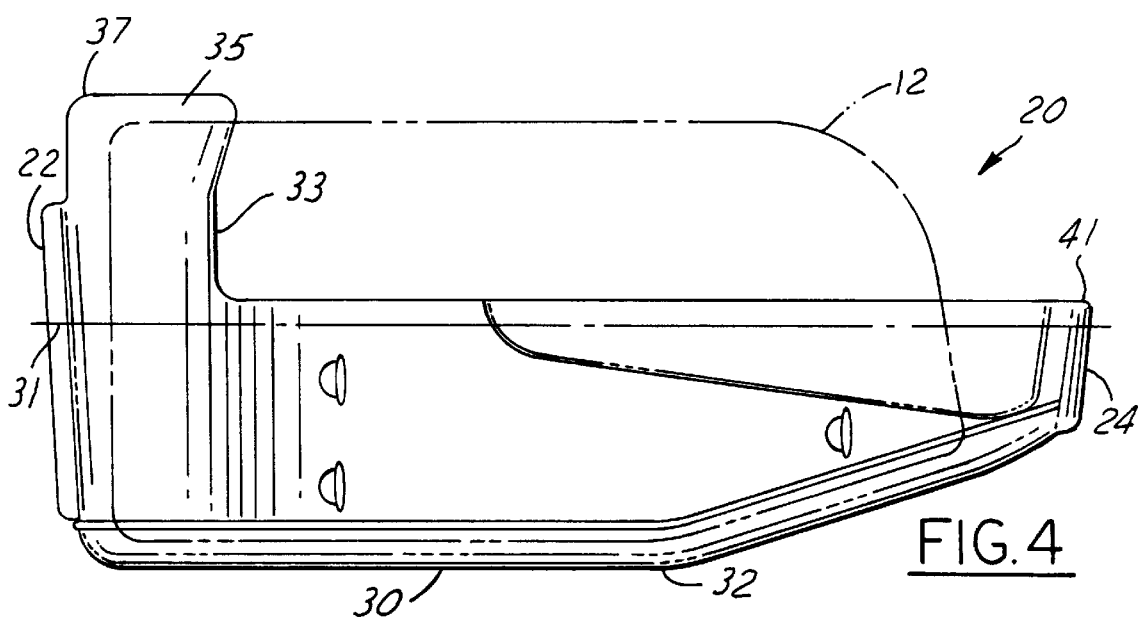

Turning now to FIGS. 2–6, fuel tank support 20 will be described in further detail. In particular, support 20 includes front wall 22, rear wall 24, side walls 26 and 28, and bottom wall 30, each cooperating to form a bathtub shaped enclosure having longitudinal axis 31 and defining interior 33 and exterior 35. Bottom wall 30 slopes from front wall 22 to rear wall 24, although the slope begins about midway along the length of bottom wall 30, as shown by inflection 32 extending substantially between side walls 26 and 28 and perpendicular to axis 31. Inflection 32 provides lateral integrity to support 20. Front wall 22 substantially covers the entire front portion of fuel tank 12, as best shown in FIG. 4.

Figure 5:
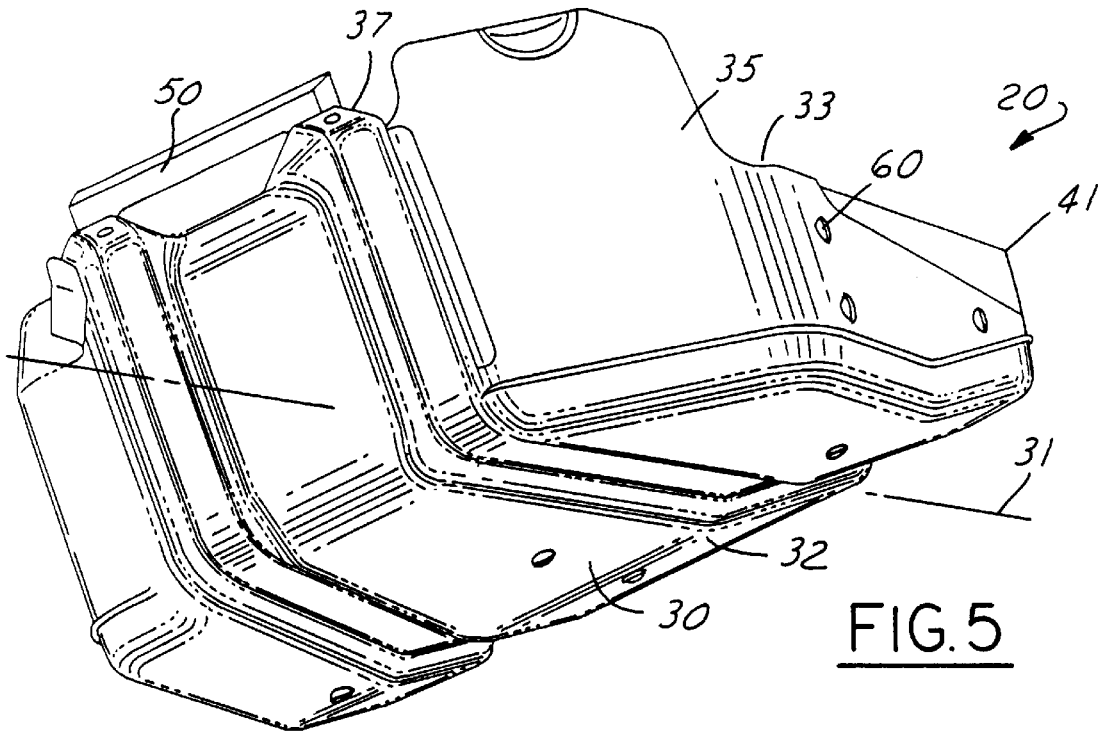
Figure 6:
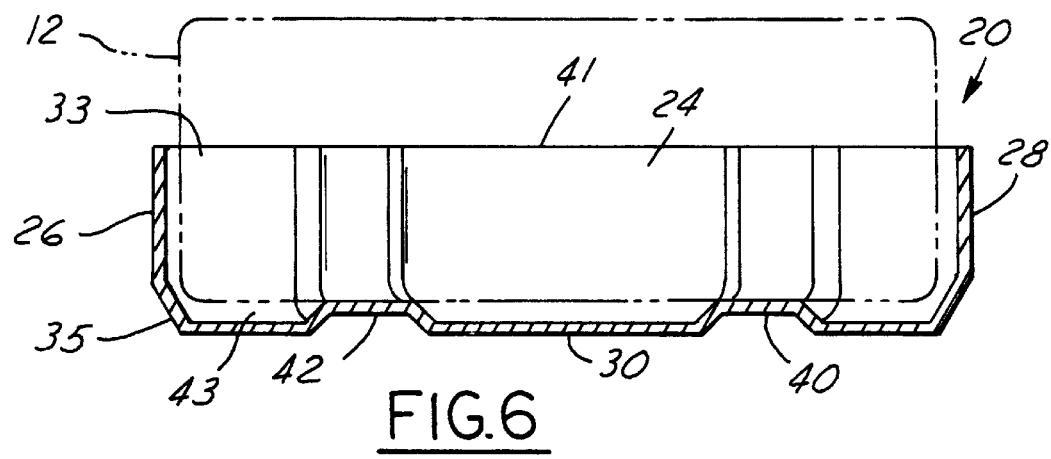
FIG. 6 is a cross-sectional view of the fuel tank support taken along line 6—6 of FIG. 3; and, FIG. 7 is a portion of the fuel tank support according to the present invention.

Continuing with reference to FIGS. 2–6, fuel tank support 20 includes forward mounting flange 34 and rear mounting flange 36 formed at peripheral edges 37 and 41. Flanges 34 and 36 include mounting holes 38a and 38b, and 39a and 39b, respectively, for attaching fuel tank support to vehicle 10. In addition, fuel tank support 20 includes integrally formed mounting support structures 40 and 42. As best shown in FIG. 6, each support structures 40 and 42 is formed by pressing bottom wall 30, front wall 22 and rear wall 24 into a generally channel-shaped section. That is, each support structures 40 and 42 is formed as a depression on the exterior surface of walls 22, 24 and 30 and extends toward interior 33. These channel-shaped sections provide longitudinal structural integrity for fuel tank support 20, thereby obviating the use of separate mounting straps to mount support 20 to vehicle 10. Further, when tank 12 is supported within support 20, support structures 40 and 42 space tank 12 away from bottom wall 30, thereby providing air gap 43 between tank 12 and support 20. In addition, as best shown in FIG. 3, support structures 40 and 42 are formed aparallel (not parallel) to longitudinal axis 31 and diverge from front wall 22 to back wall 24. This provides added lateral structural integrity, thereby obviating the need for additional, integrally formed and laterally extending, structural supports.

In addition to supporting fuel tank 10, support 20 deflects heat away from tank 12. This heat may be in the form of engine compartment heat or direct heat from exhaust pipe 16. In the case of exhaust pipe 16, side walls 26 and 28 act to protect and shield fuel tank 12. In the case of hot engine compartment air, as the vehicle moves forward, deflector 50 may be mounted to support 20, as seen in FIG. 5. Deflector 50 deflects heat either above or below support 20.

Figure 7:
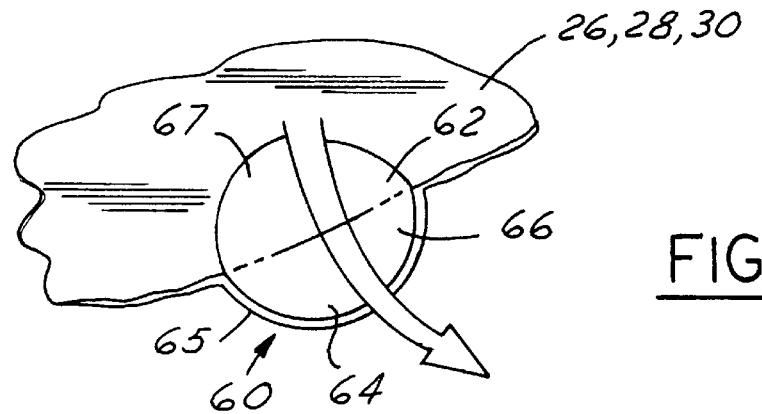

According to the present invention, to vent stagnant air between fuel tank 12 and fuel tank support 20, apertures 60 are formed spaced along fuel tank support 20. Each aperture 60, as best shown in FIG. 7, includes opening 62 in a wall section of support 20 (such as bottom wall 30), a generally concave interior facing surface 64, a complementing generally convex exterior facing surface 65 and opening 66. Forward facing end 67 is attached to the wall and rearward facing open end 66 is not attached to the wall such that, as vehicle 10 moves forward, a vacuum is created around open end 66, thereby drawing air, as shown by flow arrow F, from vent hole 62. Thus, stagnant hot air is vented away from plastic fuel tank 12. It should be noted that walls 26 and 28 have similar apertures, and FIG. 7 is exemplary for those cases as well.

While the best mode for carrying out the invention has been described in detail, those skilled in the art in which this invention relates will recognize various alternative designs and embodiments, including those mentioned above, in practicing the invention that has been defined by the following claims.

We claim:

1. A fuel tank support for supporting a fuel tank on an automotive vehicle, with said fuel tank support comprising:
   a front wall, a rear wall, a bottom wall joining said front and rear walls, and side walls joining said front and rear walls and said bottom wall, with said walls cooperating to form an enclosure having an exterior and an interior for holding the fuel tank, with said fuel tank support defining a longitudinal axis extending through said front wall and said rear wall;
   a pair of mounting channels integrally formed into said front wall, said rear wall and said bottom wall;
   a pair of mounting flanges, each formed on a peripheral edge of said front and said rear walls, respectively, and integrally formed to said mounting channels for mounting said fuel tank support to the vehicle;
   wherein said mounting channels are formed aparallel to said longitudinal axis of said fuel tank support.

2. A fuel tank support according to claim 1 wherein said mounting channels are formed as a depressions on an outer surface of said front, rear and bottom walls, with said mounting channels thereby adapted for spacing said front, rear and bottom walls away from the fuel tank.

3. A fuel tank support according to claim 1 wherein said bottom wall includes an inflection extending between said side walls along an axis generally perpendicular to said longitudinal axis.

4. A fuel tank support according to claim 1 further comprising a deflector mounted at said peripheral edge of said front wall for deflecting air around said fuel tank support.

5. A fuel tank support according to claim 1 further comprising a plurality of vents extending through a plurality of said walls for venting air from said interior of said fuel tank support.

6. A fuel tank support according to claim 5, wherein said each said vent comprises a hole extending through a said wall, and an interior facing concave surface formed on said exterior of said support and substantially covering said hole, with said concave surface being attached to a said wall at a forward facing end thereof and being open at a rearward facing end thereof.

7. A fuel tank support for supporting a fuel tank on an automotive vehicle, with said fuel tank support comprising:
   a front wall, a rear wall, a bottom wall joining said front and rear walls, and side walls joining said front and rear walls and said bottom wall, with said walls cooperating to form an enclosure having an exterior and an interior for holding the fuel tank, with said fuel tank support defining a longitudinal axis extending through said front wall and said rear wall;
   a pair of mounting channels integrally formed into said front wall, said rear wall and said bottom wall, with said mounting channels terminating at a peripheral edge of said front and said rear walls, respectively, into a pair of mounting flanges, respectively, with said mounting flanges being adapted to mount said fuel tank support to the vehicle; and
   a plurality of vents extending through a plurality of said walls for venting air from said interior of said support, with each said vent comprising a hole extending through one of said walls, an interior facing concave surface formed on said exterior of said fuel tank support and substantially covering said hole, with said concave surface being attached to one of said walls at a forward facing end thereof and being open at a rearward facing end thereof.

8. A fuel tank support according to claim 7 wherein said mounting channels are formed aparallel to said longitudinal axis of said fuel tank support.

9. A fuel tank support according to claim 7 wherein said mounting channels are formed as depressions on an outer surface of said front, rear and bottom walls, with said mounting channels thereby adapted for spacing said front, rear, and bottom walls away from the fuel tank.

10. A fuel tank support according to claim 7 wherein said bottom wall includes an inflection extending between said side walls along an axis generally perpendicular to said longitudinal axis.

11. A fuel tank support according to claim 7 further comprising a deflector mounted at said peripheral edge of said front wall for deflecting air around said fuel tank support.

12. A fuel tank support for supporting a fuel tank on an automotive vehicle, with said fuel tank support comprising:
   a front wall, a rear wall, a bottom wall joining said front and rear walls, and side walls joining said front and rear walls and said bottom wall, with said walls cooperating to form an enclosure having an exterior and an interior for holding the fuel tank, with said fuel tank support defining a longitudinal axis extending through said front wall and said rear wall;
   a pair of mounting channels integrally formed into said front wall, said rear wall and said bottom wall, with said mounting channels being formed aparallel to said longitudinal axis of said fuel tank support and being formed as depressions on an outer surface of said front, rear and bottom walls, with said mounting channels thereby adapted for spacing said front, rear and bottom walls away from the fuel tank; and, a pair of mounting flanges, each formed on a peripheral edge of said front and said rear walls, respectively, and integrally formed to said mounting channels for mounting said fuel tank support to the vehicle; and, a plurality of vents extending through a plurality of said walls for venting air from said interior of said support, with each said vent comprising a hole extending through one of said walls, and an interior facing concave surface formed on said exterior of said support and substantially covering said hole, with said concave surface being attached to one of said walls at a forward facing end thereof and being open at a rearward facing end thereof.

13. A fuel tank support according to claim 12 wherein said bottom wall includes an inflection extending between said side walls along an axis generally perpendicular to said longitudinal axis.

14. A fuel tank support according to claim 12 further comprising a deflector mounted at said peripheral edge of said front wall for deflecting air around said fuel tank support.

\* \* \* \* \*